United States Patent [19]
Marth et al.

[11] 4,024,965
[45] May 24, 1977

[54] BAG PALLETIZING APPARATUS

[75] Inventors: Gerald A. Marth, Waukesha; Wayne E. Hunnicutt, Big Bend; Daniel Lee Jones, Waukesha, all of Wis.

[73] Assignee: Manierre Corporation, Waukesha, Wis.

[22] Filed: Oct. 15, 1975

[21] Appl. No.: 622,562

[52] U.S. Cl. .............................. 214/6 P; 198/374; 214/6 S
[51] Int. Cl.² ...................................... B65G 57/24
[58] Field of Search ................. 214/6 P, 6 DK, 6 S; 198/31 AC, 107, 219, 235, 282, 283, 374, 442

[56] References Cited

UNITED STATES PATENTS

| | | | |
|---|---|---|---|
| 1,926,593 | 9/1933 | Mayo | 198/31 AC |
| 2,560,995 | 7/1951 | Stiles | 198/32 |
| 2,627,334 | 2/1953 | Koppel et al. | 198/31 AC |
| 2,958,431 | 11/1960 | Curtenius | 214/6 DK |
| 3,054,516 | 9/1962 | Joa | 214/6 DK |
| 3,069,050 | 12/1962 | Brettrager | 214/8.5 G X |
| 3,294,257 | 12/1966 | Davies et al. | 198/235 X |
| 3,587,876 | 6/1971 | Dahlem et al. | 198/235 X |
| 3,700,127 | 10/1972 | Kurk et al. | 214/6 P X |
| 3,854,601 | 12/1974 | Miller et al. | 214/6 P |

Primary Examiner—L. J. Paperner
Attorney, Agent, or Firm—Henry C. Fuller

[57] ABSTRACT

Palletizing apparatus for bags includes a bag flattener and vibrator, a bag pattern forming diverter, a row forming station, a full layer forming station, a pallet elevator and a pallet magazine. A programmable control for the diverter provides automatic sequencing of the diverter for orienting the bags in left or right lanes on a diverter conveyor to form a selected bag pattern. Either left or right lane can be provided with a turnpost which has a controlled deflector which either exposes the turnpost for rotating the bags 90 degrees or guides bags past the turnpost depending on the selected pattern. The programmable control enables automatic control of the diverter to provide successive layers of the same pattern but with a different orientation and also afford formation of many different bag patterns. The final layer forming station has movable guides to square the patterned layers before deposition on the pallet in the pallet elevator and guide the layer as it is deposited on the pallet. Each palletized layer is compressed by raising the layer against the pallet elevator apron.

3 Claims, 31 Drawing Figures

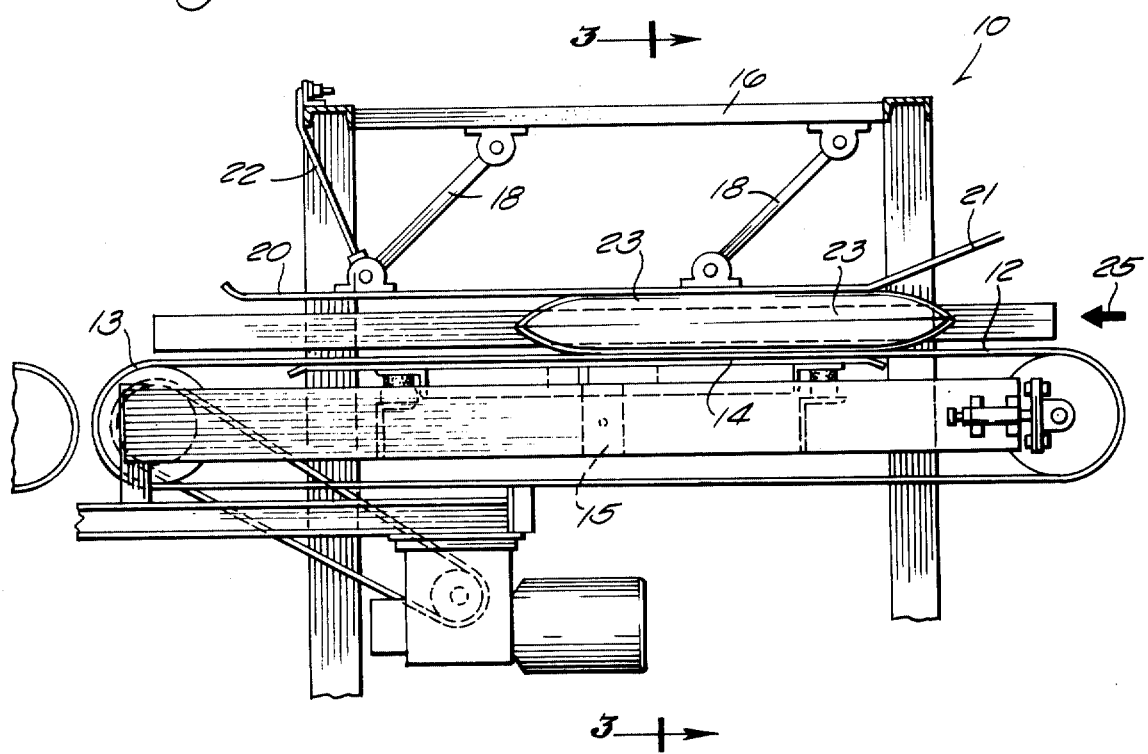

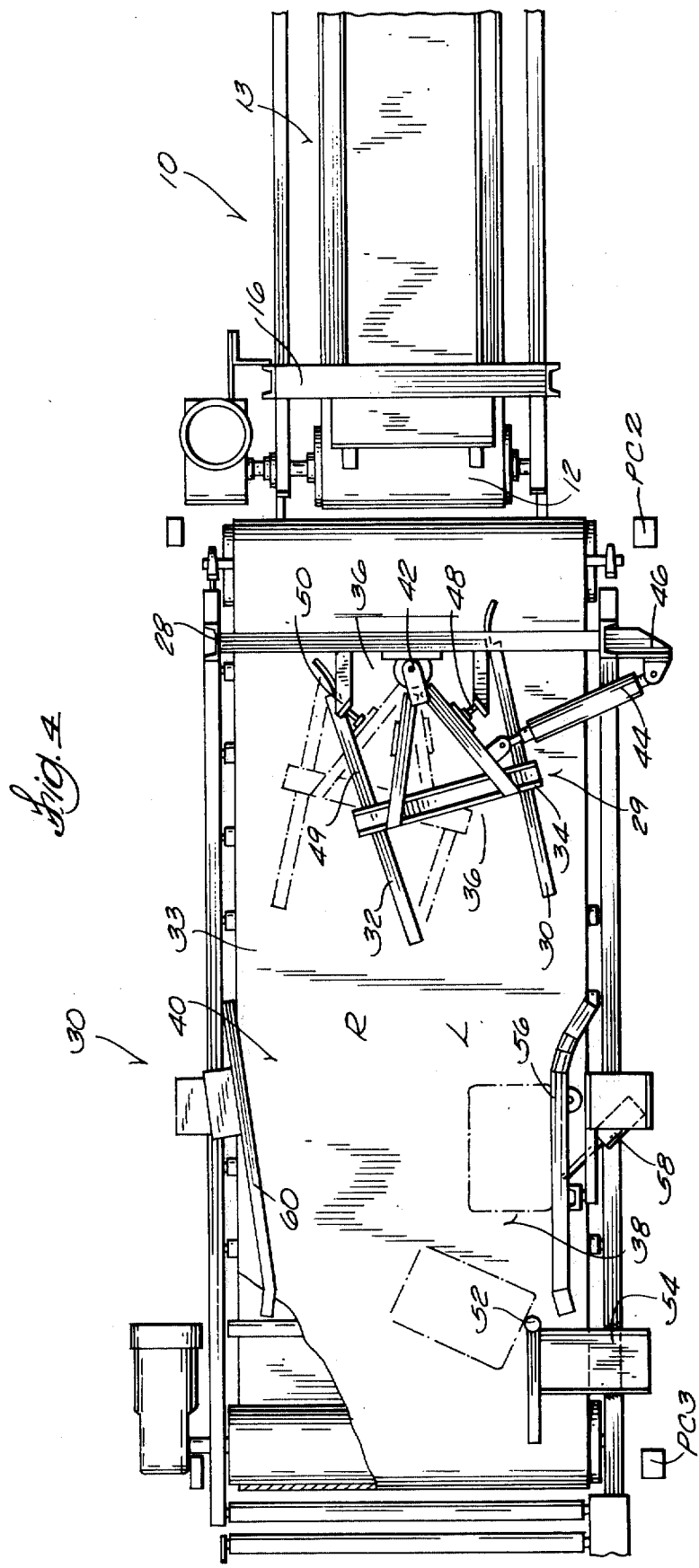

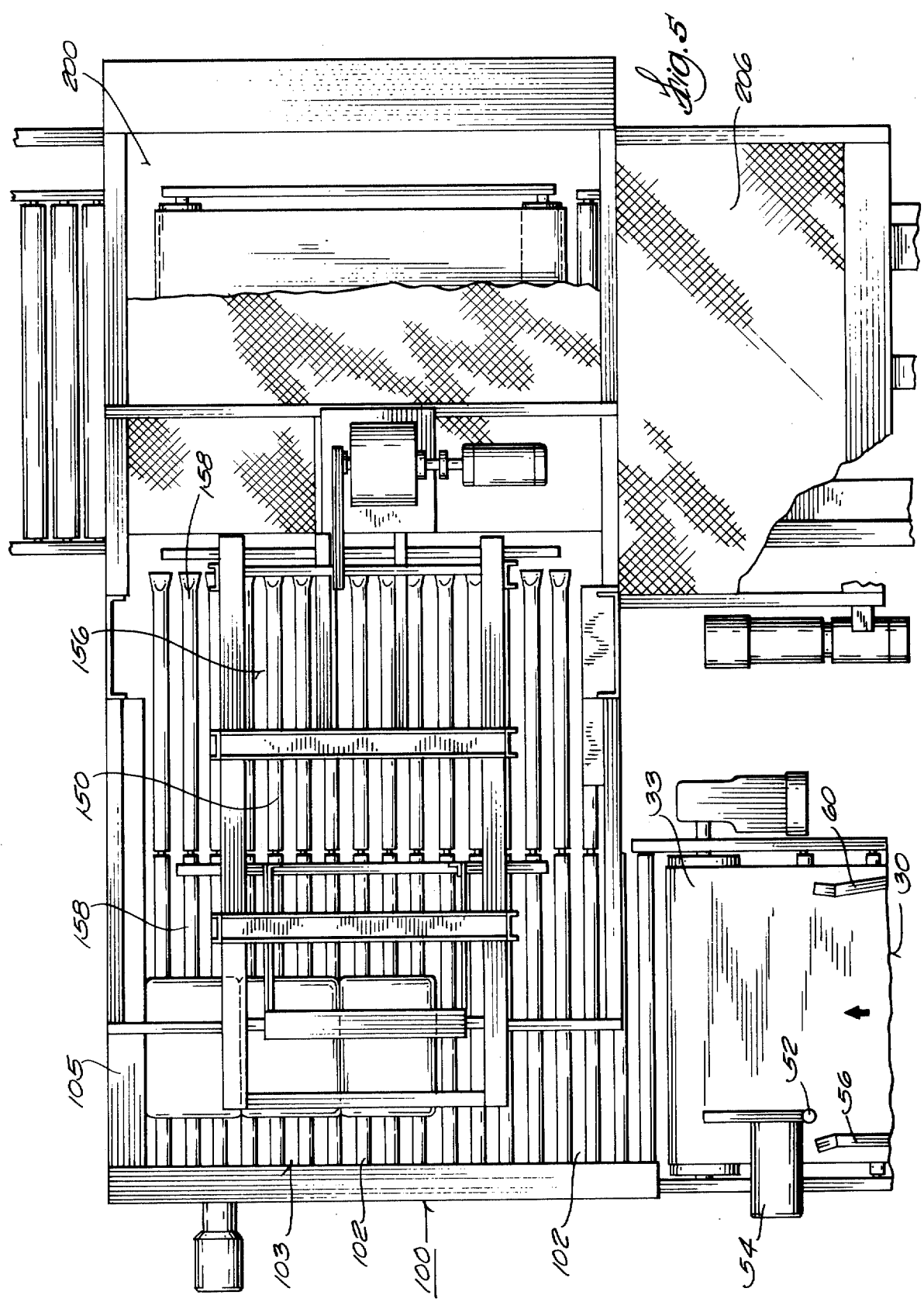

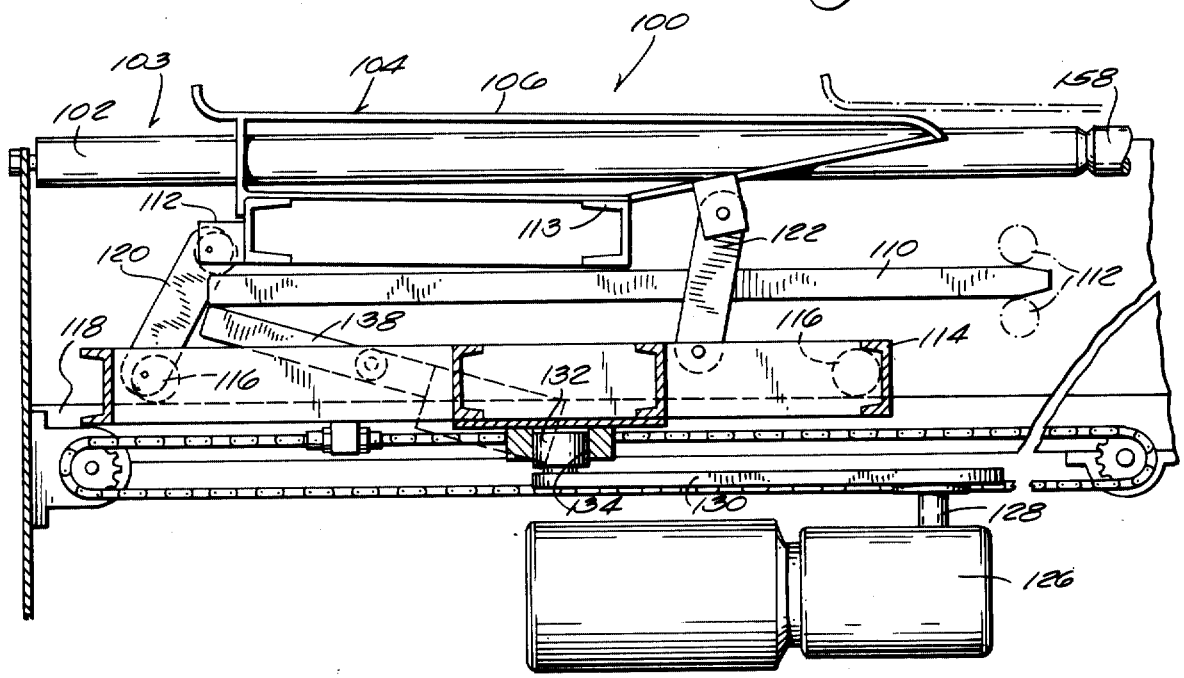
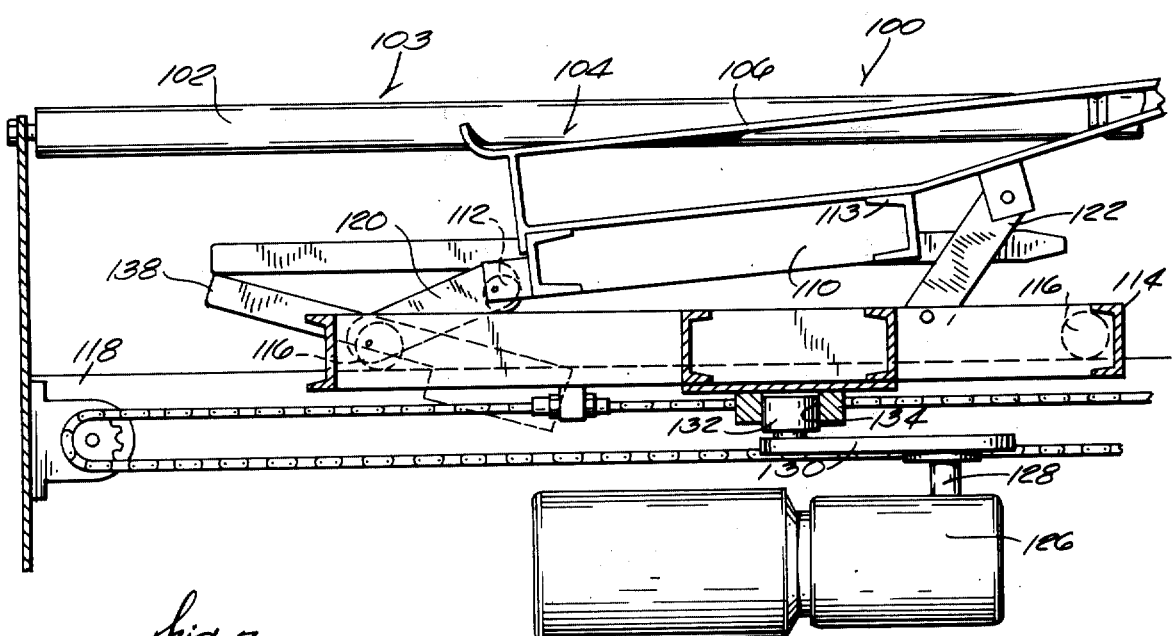

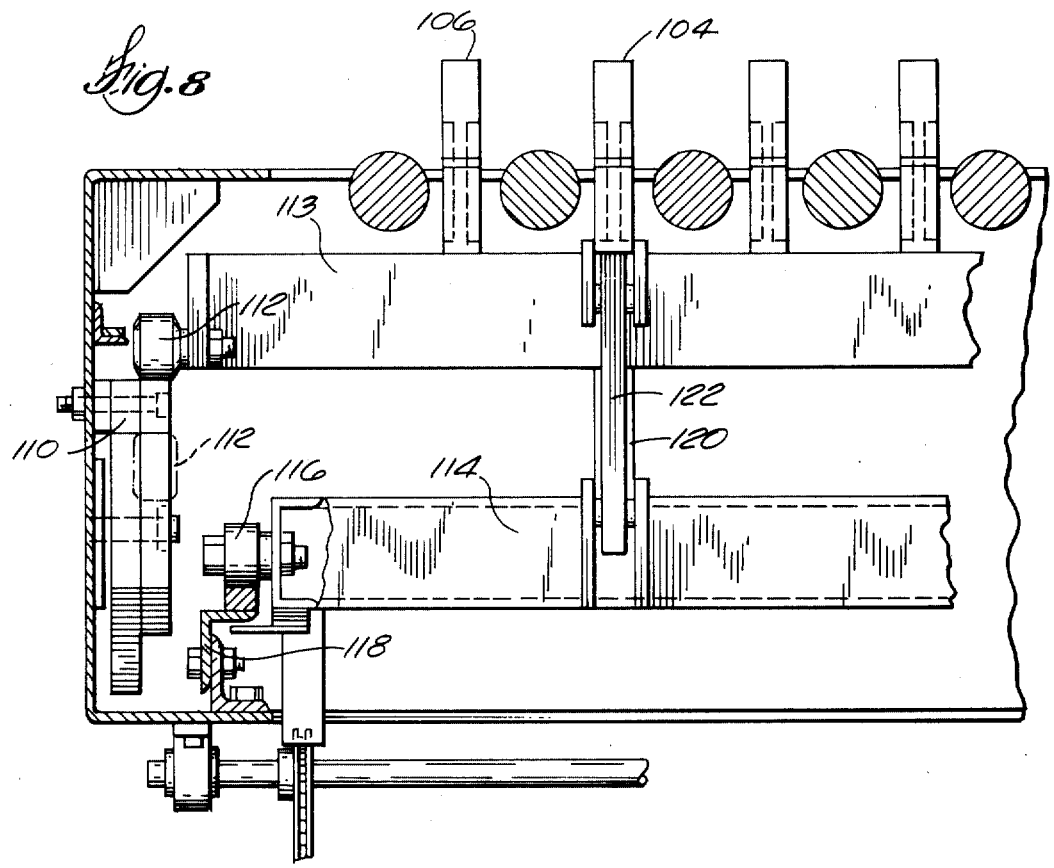
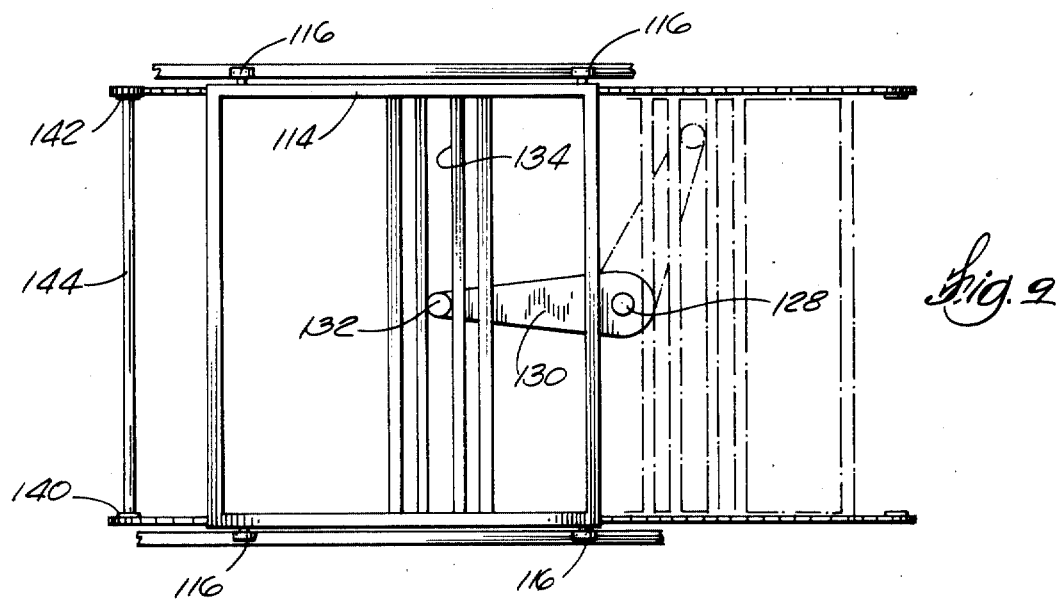

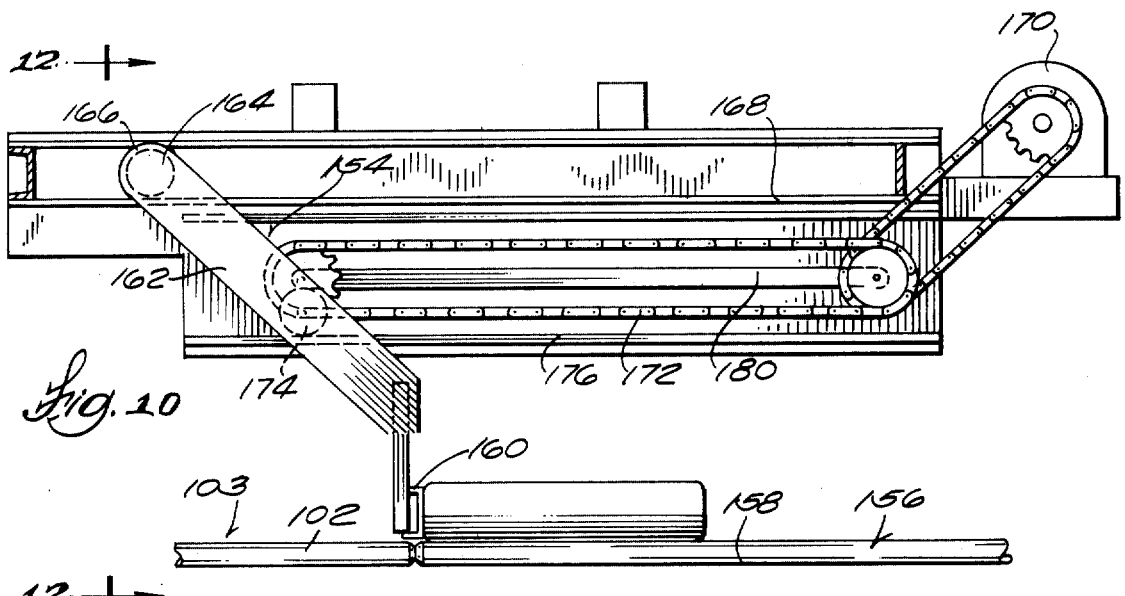
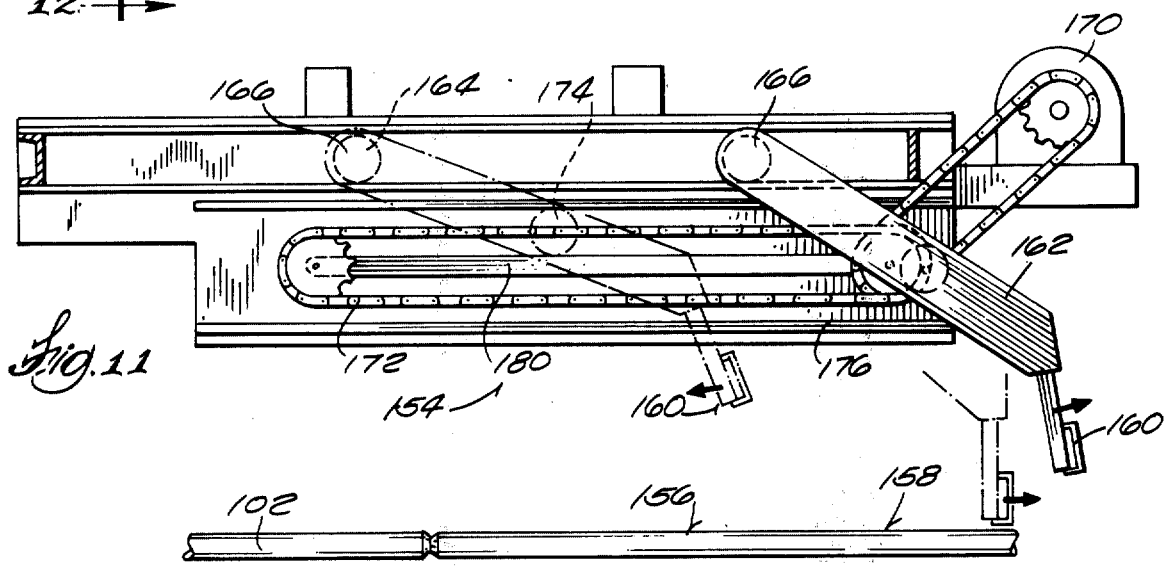
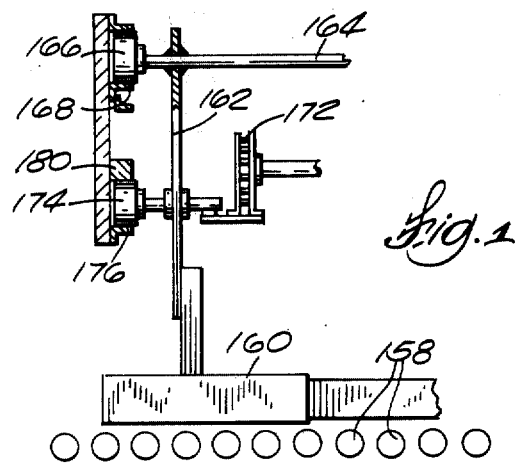

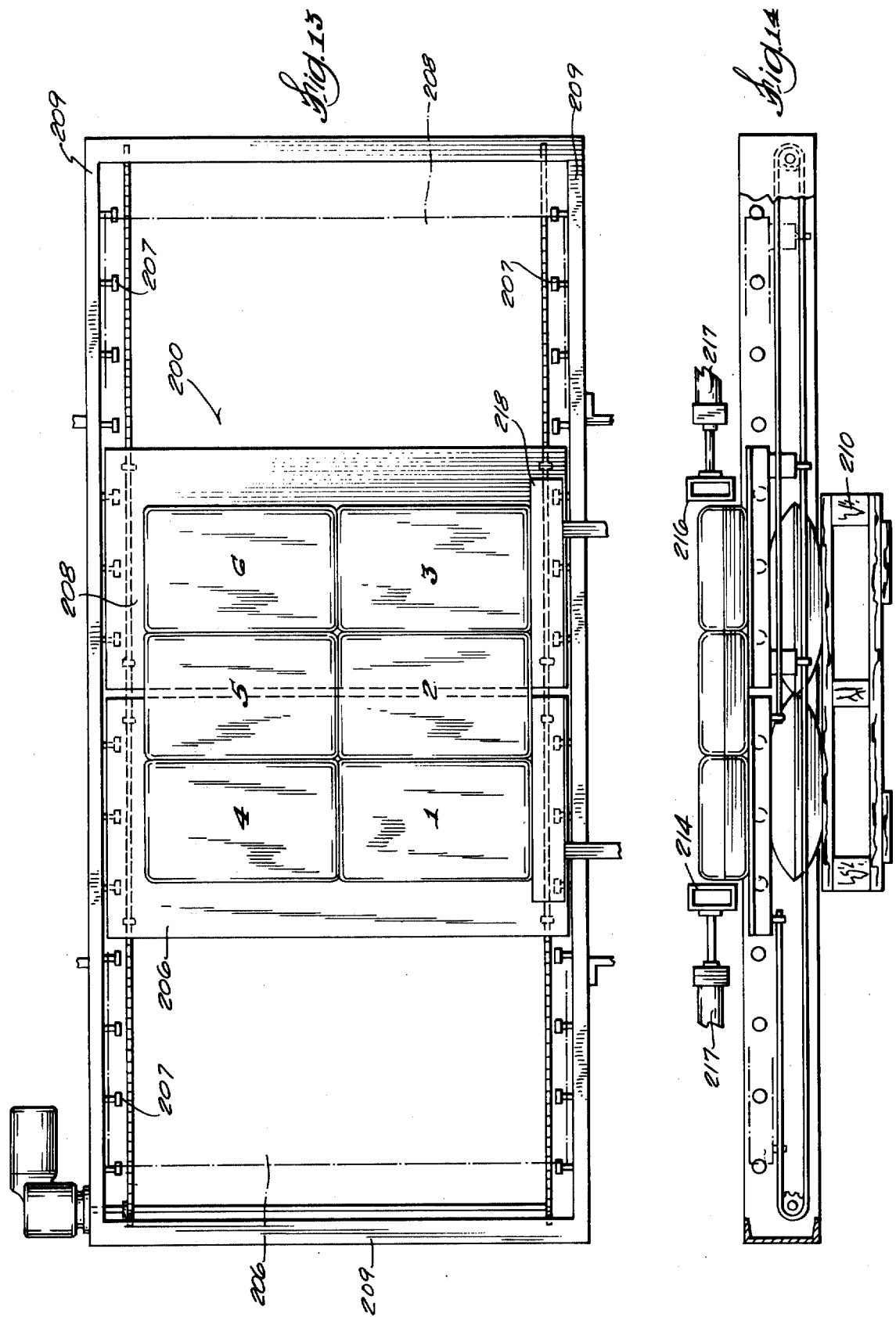

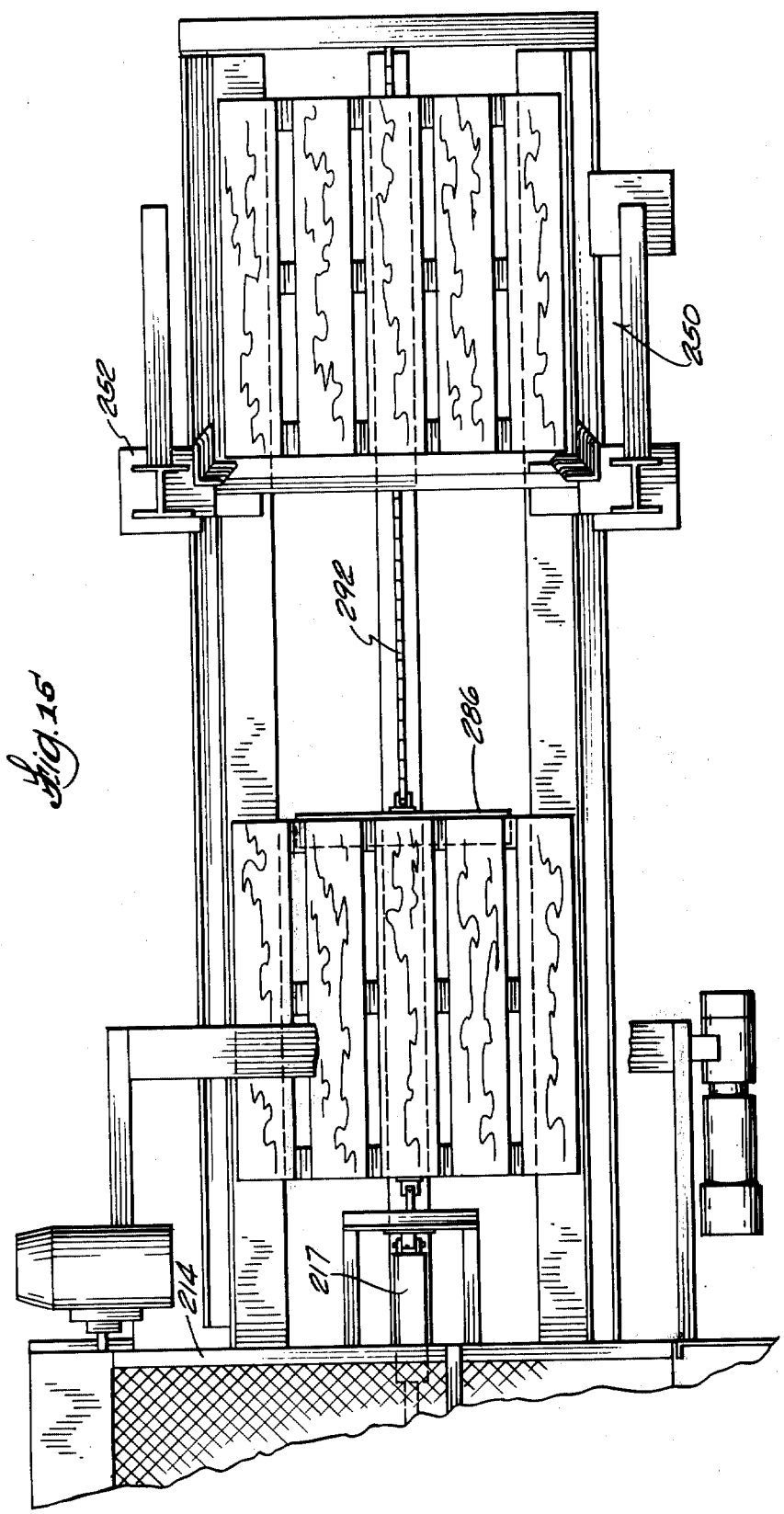

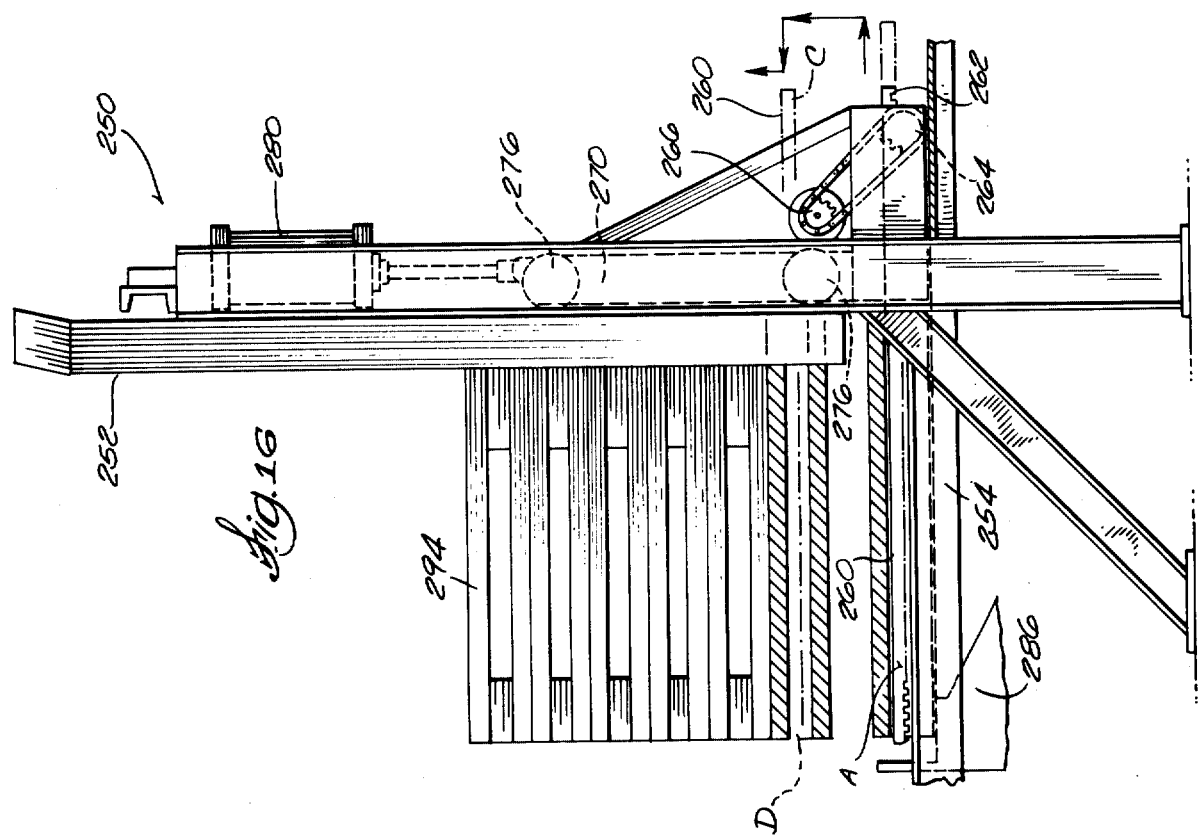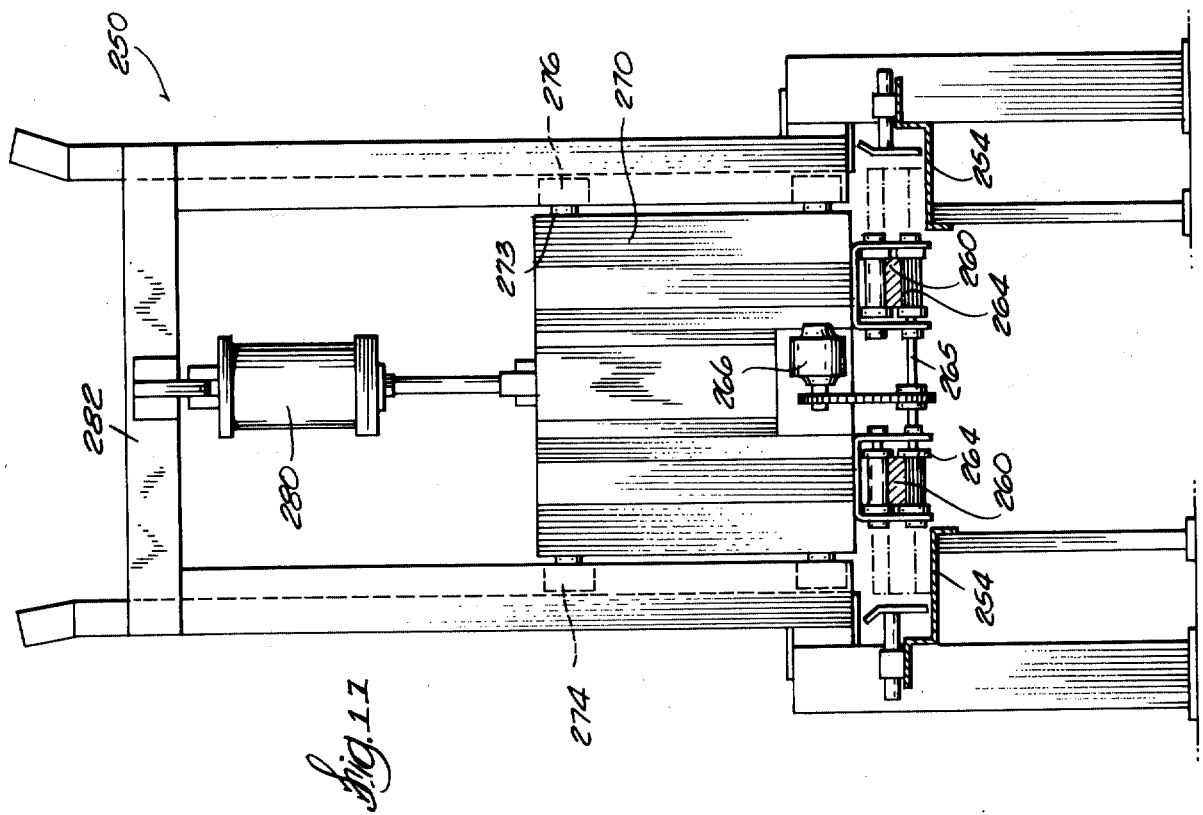

BAG PALLETIZING APPARATUS

SUMMARY OF INVENTION

A bag diverter station is provided for orienting bags in a proper position to form any number of selected bag patterns. The diverter station includes a chute formed from spaced guide rails which is pivoted between first and second positions to send bags down right and left parallel lanes on the diverter conveyor. Bags travelling along either lane can be rotated 90° by exposing a turnpost, if required for a selected bag pattern, which engages the bag at a point offset from the longitudinal center line of the bag to rotate the bag 90° under pressure of the conveyor carrying the bags. A programmable controller contains counters which count impulses from photocells which are positioned along the diverter conveyor to count bags and change the position of the diverter and expose the turnpost if required, when the proper number of bags have been counted.

The row forming station downstream of the diverter station accumulates bags in patterned rows. The patterned rows are then transferred to a full layer forming station by a transfer fork.

When all rows of bags to complete the full bag layer are accumulated, the layer is swept onto an apron formed by two packer plates at the final layer forming station. The bag layer is then squared and gaps in the pattern closed by compression of the full layer sweep bar and one or more movable side rails arranged around the packer plates. After the patterned layer has been squared the two packer plates separate and retract depositing the bags on a pallet or on a previous layer of bags on the pallet. After the bags on the layer have been placed on the pallet the packer plates close and the pallet elevator raises the pallet and presses the top layer of bags against the under surface of the closed packer plates to compress and flatten the bags.

The palletizing apparatus of the invention also includes a pallet dispenser. The pallet dispenser has an upright frame provided with tracks and a subframe having trolley wheels to enable vertical reciprocation of the trolley on the upright frame. A power cylinder causes vertical movement of the trolley. The trolley is provided with a fork which is movable in a horizontal plane. In this regard, the fork has rack teeth on the under surface of the fork members and a motor supported on the trolley drives a shaft with pinions which engage the fork teeth and move the fork in the horizontal positions. The fork can be withdrawn from a pallet stack to deposit the pallets on conveying means which carry a free pallet to the pallet elevator. After the pallet stack is deposited on the conveyor the fork is withdrawn in a first horizontal path free of the stack and the trolley is elevated and the fork is re-inserted in the lowest pallet of the stack above the pallet to be released on the conveyor. The trolley is then elevated to separate the pallet stack from the lower pallet.

Further objects, advantages and features of the invention will become apparent from the following disclosure.

DESCRIPTION OF DRAWINGS

FIG. 2 is an enlarged fragmentary side elevational view of the bag vibrating and flattening station shown in FIG. 1.

FIG. 3 is an end view of the vibrating and flattening station shown in FIG. 2.

FIG. 4 is an enlarged plan view of the bag diverter station shown in FIG. 1.

FIG. 5 is a plan view of the row forming station, layer forming station and pallet elevator.

FIG. 6 is a side elevational view of the row transfer fork.

FIG. 7 is a view similar to FIG. 6 showing the row transfer fork in position for return movement.

FIG. 8 is an enlarged fragmentary sectional view of the row transfer fork shown in FIGS. 6 and 7.

FIG. 9 is a plan view of part of the mechanism for shifting the row transfer fork shown in FIGS. 6 and 7.

FIG. 10 is a side elevational view of the full layer sweep mechanism.

FIG. 11 is a view similar to FIG. 10 showing the sweep in various positions.

FIG. 12 is a sectional view along line 12—12 of FIG. 10.

FIG. 13 is a plan view of the pallet elevator.

FIG. 14 is a side elevational view of the pallet elevator shown in FIG. 13.

FIG. 15 is a plan view of a pallet dispenser and mechanism for moving pallets from the pallet dispenser to the pallet elevator.

FIG. 16 is a side elevational view of the pallet dispenser.

FIG. 17 is an end view of the pallet dispenser shown in FIG. 16.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
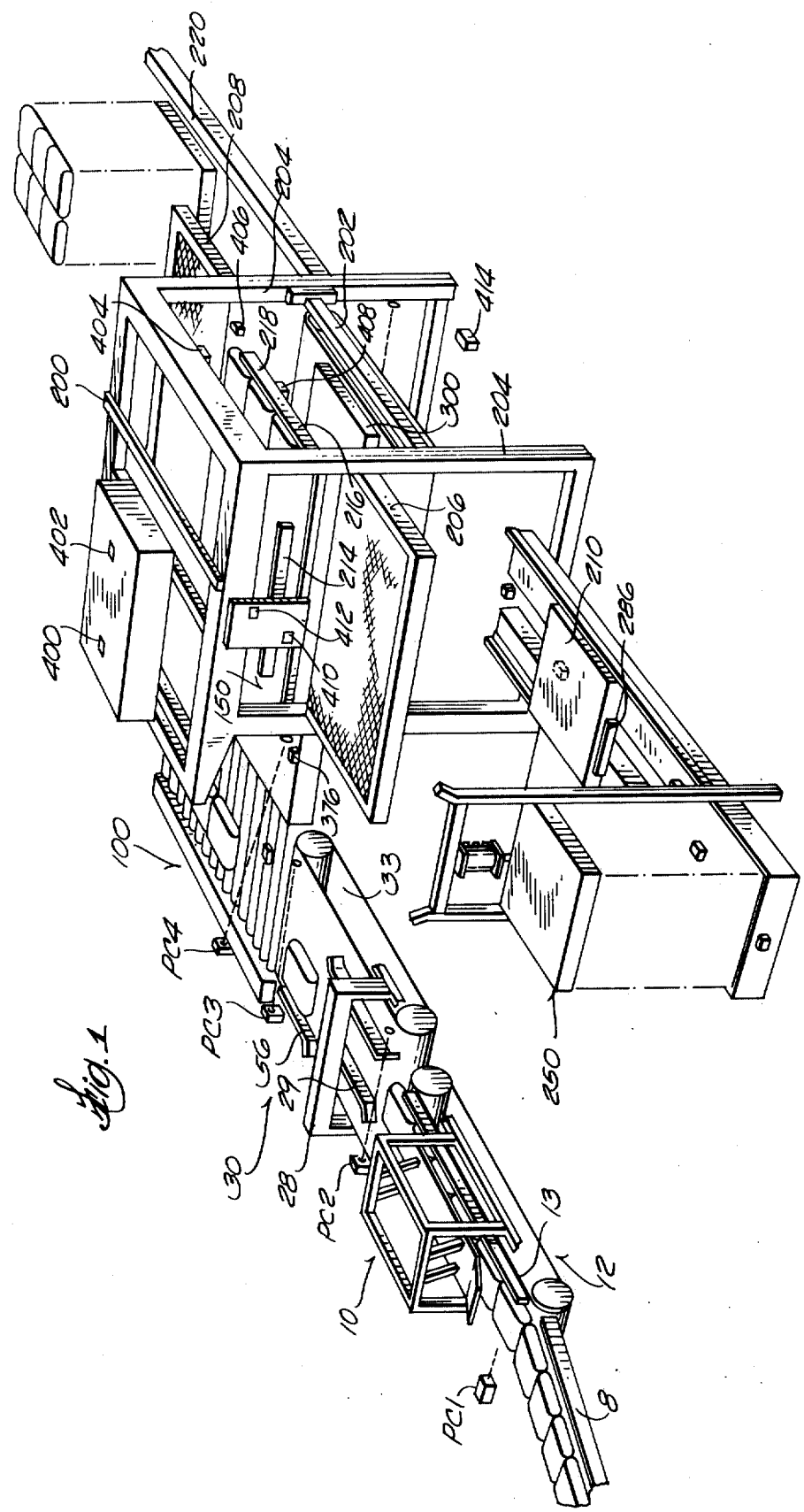
FIG. 1 is a diagrammatic perspective view of the palletizing apparatus of the invention.
Figure 18:
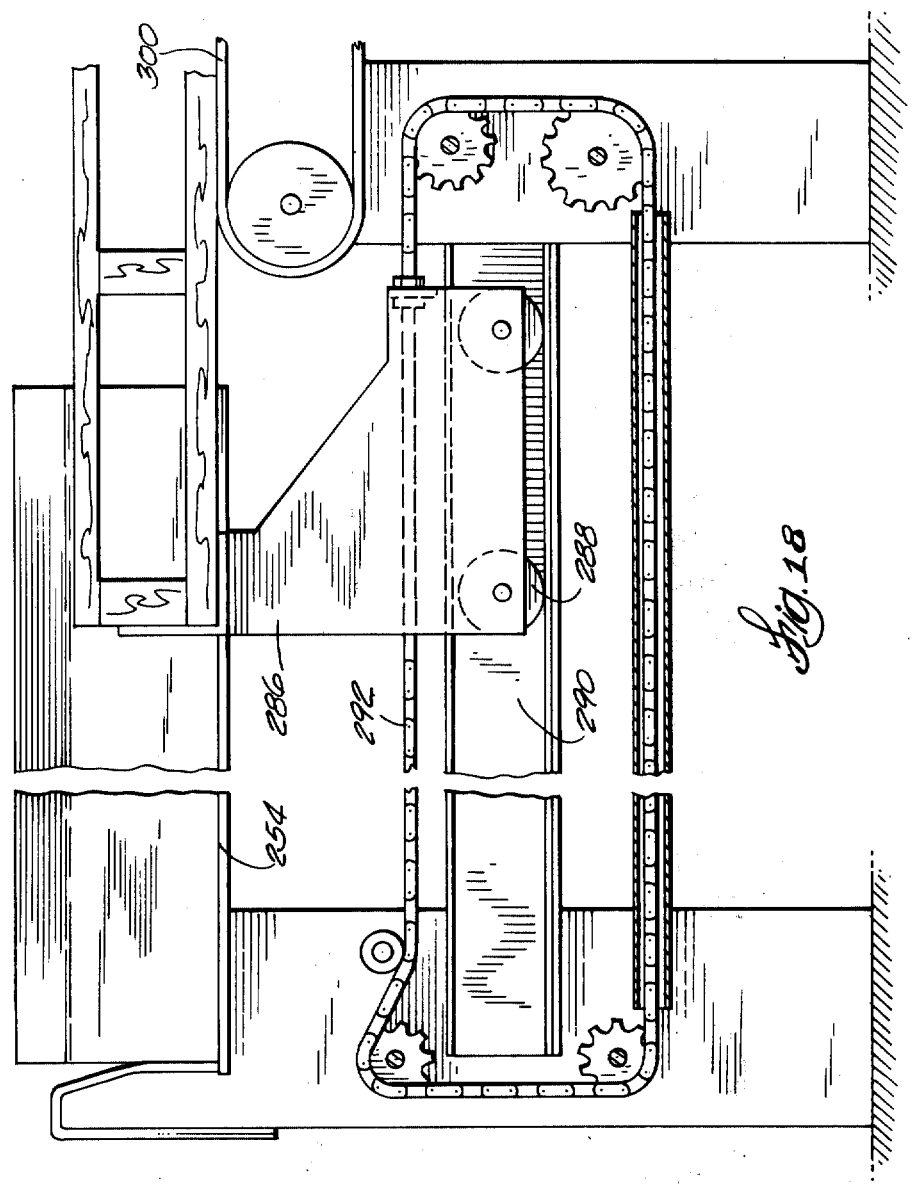
FIG. 18 is a side elevational view of the pallet push mechanism for moving the pallets from the pallet dispenser to the pallet elevator.
Figure 19:
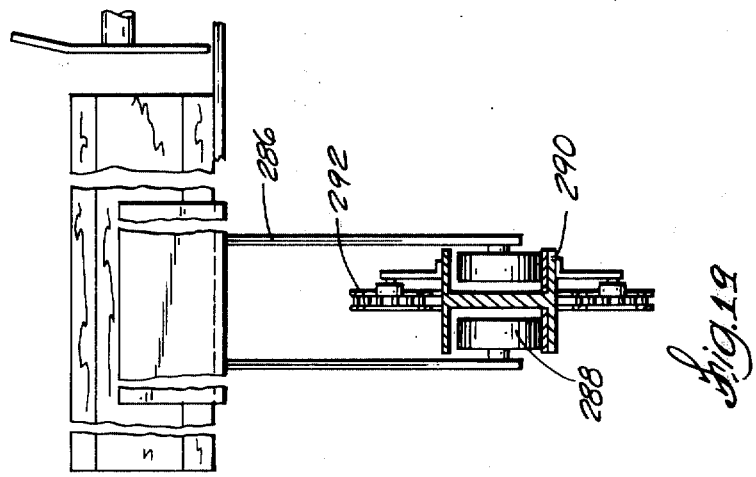
FIG. 19 is a sectional view of portions of the pallet push mechanism.

The FIG. 1 schematically shows the various stations or stages of the palletizing machine at which different functions are performed. The supply conveyor 8 provides a supply of bags to a bag flattener and vibrating station 10 from which flattened bags are delivered to a bag diverting station 30 at which bags are shifted and turned into programmed positions to form bag rows at the row forming station 100. The patterned row of bags is shifted to a layer forming station 150 where a complete patterned layer of bags is formed and subsequently swept onto an apron formed by coplaner packer plates 206, 208 at the final layer forming station 200 over the pallet elevator 200. On the apron, pattern squaring bars press against the bag layer to square the layer, and control or eliminate gaps between the bags. The packer plates 206, 208 are then separated and withdrawn from beneath the layer to deposit the bag layer on a pallet located beneath the packer plates. The pallet and bag layer is then lowered, the packer plates closed and the bag layer moved upwardly against the packer plates to flatten the layer of bags. Pallets are delivered to the pallet elevator 200 by a pallet dispenser 250. The details of the structures to accomplish these functions are presently described.

BAG FLATTENER AND VIBRATOR 10

As shown in FIGS. 2, 3 the bag flattener and vibrator 10 includes a conveyor 12 which has an upper run 13 travelling over a platen 14. Bags are delivered to conveyor 12 by a supply conveyor 8 which can operate by gravity. The platen 14 is in contact with conveyor run 13. Bags on run 13 are oscillated or vibrated by a rotary oscillator 15 which can be in the form of an air motor with an eccentric fixed to the platen 14. The vibrating platen 14 evenly distributes the bag contents. An overhead frame 16 pivotally supports a parallel linkage 18 connected to a flattening plate 20 which has an upturned lead-in 21. The bags 23 travel in the direction of arrow 25. The degree of flattening desired is adjusted by adjusting the length of a chain or strand 22 which is connected between the plate 20 and the frame 16, and thus adjusting the gravity weight of the plate 20 on the bag 23. The length of the chain 22 is also adjusted for differnt size bags.

BAG DIVERTING STATION 30

Downstream of the supply conveyor 8 and the bag flattening conveyor 12 the bag diverter station 30 changes the position and orientation of the bags received from the flattening conveyor 12 to form patterned rows at the row forming station 100.

In accordance with the invention programmable diverter means are provided to shift and turn bags in accordance with a selected program to form the desired pattern. In the disclosed construction the means includes an overhead frame 28 (FIGS. 1, 4) which spans the diverter conveyor, and a guide assembly 29 which includes two spaced guides 30, 32 which are connected by bracket 34. The spaced guides 30, 32 define a bag receiving throat 36 which tapers inwardly in a downstream direction. The tapered throat thus, facilitates bag lead-in into the throat 36 and provides positive positioning of the bag as it leaves the throat 36. Means are provided for supporting the guide assembly 29 for movement between multiple positions. As disclosed first and second positions are shown to provide bag travel in a left lane 38 and right lane 40. The guide assembly 29 is pivotally supported on the overhead frame 28 by a pivot 42. Means are provided for shifting the guide assembly 29 between the multiple positions. In the disclosed construction the means comprises a power cylinder 44 connected between the bracket 34 and a bracket 46. The first and second positions of the guide assembly 29 are defined by adjustable stops 48, 50 which are connected to the frame 28 and which engage the bracket guide assembly frame portions 49. The stops 48, 50 can be adjustably positioned by separate power cylinders (not shown) so that automatic control for bag spacing in the lanes can be provided. However, as disclosed herein the stops are not adjusted for any of the operations subsequently described.

Figure 20:
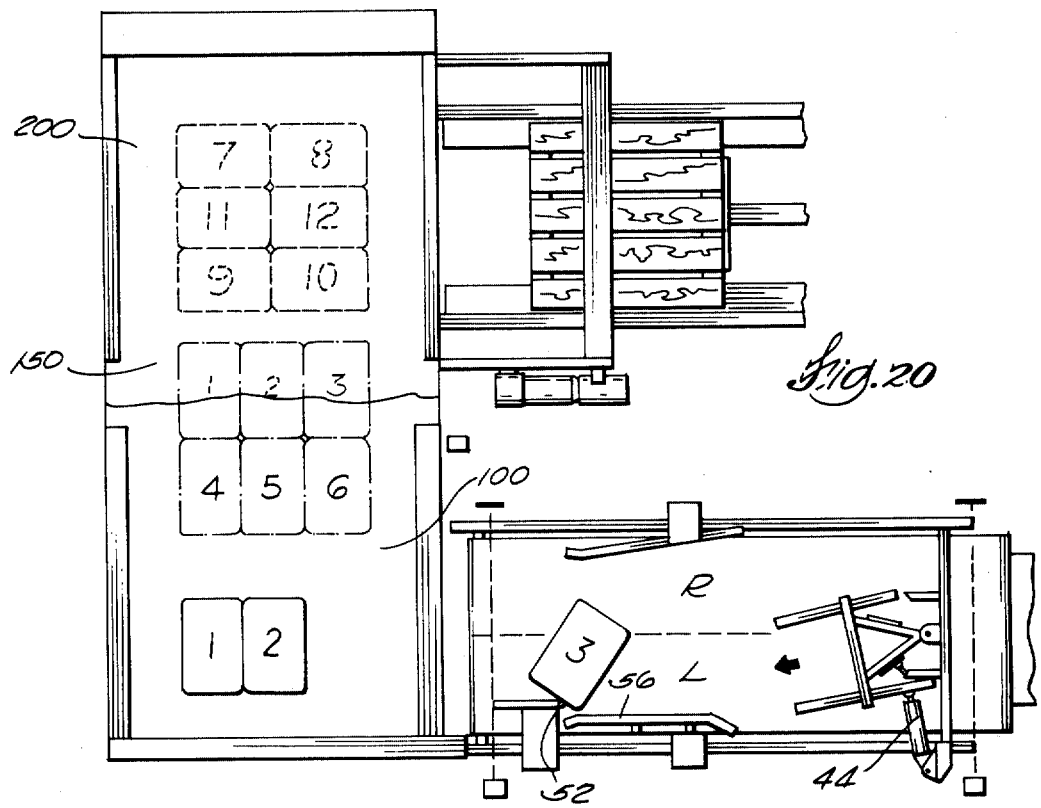
FIG. 20 is a diagrammatic plan view of the palletizing apparatus showing the formation of a pattern shown in FIG. 23.

Bags traveling in lane 38 can be rotated 90° as shown in FIG. 20 by exposing a turnpost 52 which is supported in the left lane 38. The turnpost 52 is adjustably mounted on a slide 54 to facilitate adjustment to obtain proper bag rotation for different size bags. When properly adjusted, the center line of the bag is offset from the point of contact of the turnpost 52 on the bag and thus, pressure of the bag on the turnpost caused by the conveyor 33 results in rotation of the bag 90° with respect to the axis of movement of the center-line of the bag prior to engaging the turnpost 52.

Figure 21:
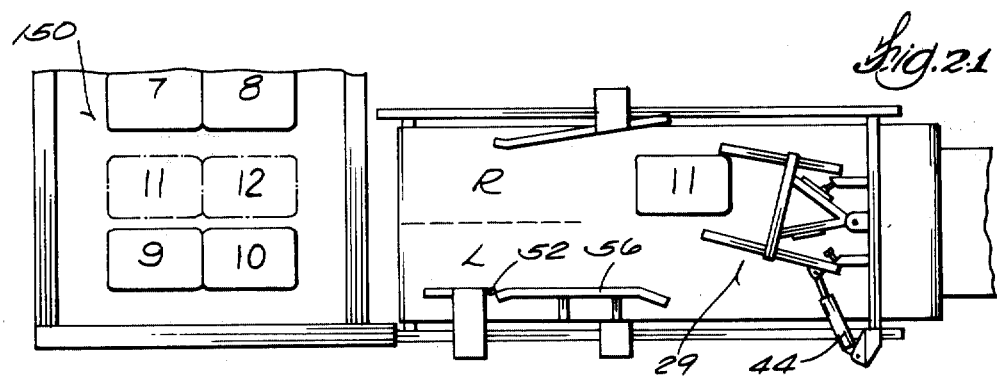
FIG. 21 is a diagrammatic plan view similar to FIG. 20 showing the formation of the second bag layer shown in FIG. 24.

To prevent turning of a bag in lane 38 for certain patterns, a guide rail or turnpost deflector 56 is provided which is movable by a power cylinder 58 from a retracted position shown in FIG. 4 to the advanced position shown in FIG. 21 to provide bag clearance with the post 52. The lane 40 can also be provided with a movable guard rail 60 and turnpost if desired. However, in illustrations subsequently described for forming specific patterns, the rail 60 and an associated turnpost are not employed. The programmable means for automatically controlling the position of the guide assembly 29 and the turnpost deflector 56 to form a selected row pattern at the row forming station are subsequently described in detail under the title "Operation."

Figure 22:
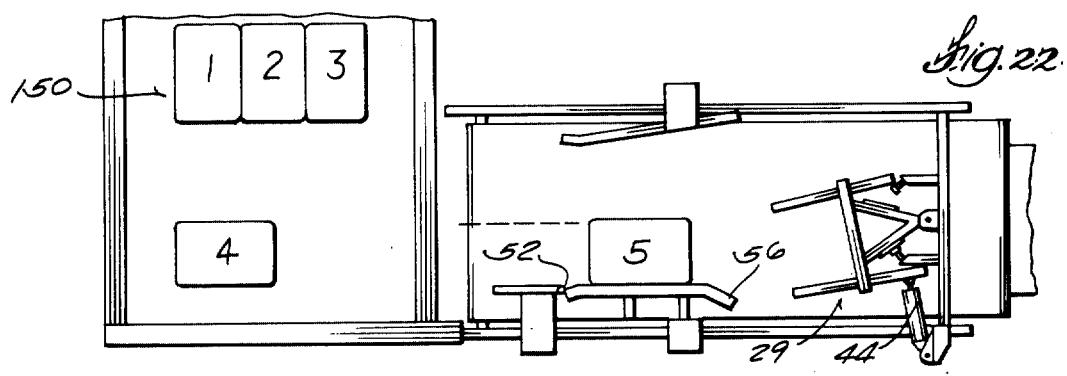
FIG. 22 is a diagrammatic plan view showing the formation of the pattern shown in FIG. 28.
Figure 23:
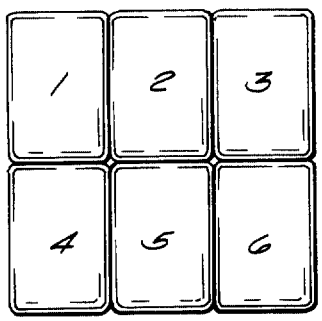
FIG. 23 is a diagrammatic view of one bag pattern and layer and of the pattern.
Figure 28:
FIG. 28 is a diagrammatic view of layer 1 of a pattern different from that shown in FIGS. 24 and 25.

The bags oriented by the bag diverting station 30 are accumulated at the row forming station to form a single patterned bag row. A row may include bags 1, 2, 3 as shown in FIG. 23 or two bags 4, 5 as shown in FIG. 28. A row is thus defined as a series of bags in a distinct pattern which form less than a full patterned layer. A layer normally includes one or more rows. The bags in a layer may have different orientations as shown in FIG. 22.

ROW FORMING STATION 100

Referring to FIG. 5, the pattern forming station 100 includes a plurality of rollers 102 which form a live bed 103 and move the bags from the diverter conveyor 33 into position against a stop rail 105 (FIG. 5). To move a discrete row from the station 100 to the full layer station where the rows are accumulated to form a complete layer, the row forming station includes a fork 104 (FIG. 6) having a plurality of tines 106 which engage the row of bags on rollers 102 and lift and move the bags above the rollers 102 to the pattern forming station 150 (FIG. 5). The fork keeps the rows of bags in the proper orientation. Means are provided for shifting the fork or advancing the fork from a first position to a second position to accomplish the bag movement between station 100 and 150 and to raise and lower the fork above and below the rollers during advance and return movement.

In the disclosed construction the means for moving the fork includes spaced fixed rails 110 (FIG. 8) on each side of the fork and guide rollers 112 rotatably connected to the fork cross frame 113. A trolley 114 which includes four rollers 116 on opposite sides of the trolley 114 support the trolley 114 for reciprocal linear movement along spaced tracks 118 on each side of the trolley 114. Links 120, 122 connect the fork cross frame 113 to the trolley 114. The means provided to reciprocate the trolley includes a motor 126 having an output shaft 128 provided with a crank arm 130 (FIG. 9) which has a crank shaft 132 located in a transverse slot 134 on the trolley 114. Rotation of the shaft 128 thus moves the crank arm 130 from the solid line position in FIG. 9 to the dotted line position and subsequently a complete revolution to cause movement of the rollers 112 along the upper surface of the guide track 110 until the rollers drop from the guide track 110 and then return beneath the guide track 110 as shown in the various dotted line positions (FIG. 6).

Weighted and pivoted arms 138 provide ramps to direct the rollers 112 upwardly on the return movement to reach the upper surface of tracks 110. Non motor driven endless chains 140, 142 (FIGS. 7, 9) can be connected to the trolley and engage sprockets carried on cross shaft 144 to provide guided movement of the trolley 114.

LAYER FORMING STATION 150

The fork 104 normally shifts a single row of bags at a time from the row forming station 100 to the layer forming station 150 (FIG. 5). For some patterns as subsequently described two rows are shifted simultaneously from live bed 103 to platform 156 at the full layer forming station 150. When all bags for a single patterned layer such as bags 1–6 (FIG. 20) are deposited on the platform 156 formed by non-driven rollers 158, the layer is swept into the pallet elevator 200 (FIG. 5) by sweep bar assembly 154 (FIGS. 10, 11, 12). The sweep bar 160 is movable in a first path as shown in FIG. 10 in contact with the bags and retracted in an elevated bag clearance position as shown in FIG. 11. The sweep bar assembly 154 includes a pair of spaced arms 162 which are connected to the sweep bar 160 and carried by an axle 164 which is provided with guide wheels 166 which travel on a track 168 (FIG. 12). Movement of the sweep bar is provided by a motor 170 which dirves a chain 172 having rollers 174 fixed to the chain. During advancement of the sweep bar 160 and during the sweeping stroke (FIG. 10) the roller 174 travels on a guide flange 176. On the return stroke the rollers 174 travel on the upper surface of the guide flange 180 which places the sweep bar 160 in an elevated clearance position over the bags being accumulated on the platform 156 for the next layer. In addition to sweeping a full layer into the pallet elevator, the sweep bar also is used to square the bag layer in the pallet elevator as subsequently described.

FINAL PATTERN FORMING STATION

The final pattern forming station 200 (FIGS. 1, 5, 13, 14) includes a pallet lift 202 which is vertically reciprocable in the pallet loading pin defined by vertical framing members 204. The drive for the pallet lift 202 is not shown inasmuch as it forms no part of the invention. Above the lift 202 there is an apron formed from two packer plates 206, 208 (FIG. 13) which are supported for horizontal movement between advanced and retracted positions by rollers 207 on frame 209. When the packer plates 206, 208 are in the advanced closed position shown in FIG. 13 the pallet layer is swept onto the packer plates by the sweep bar 160. The pallet lift 202 containing a pallet 210 is positioned beneath the packer plates 206, 208 to receive the bag layer when the packer plates are separated.

Prior to deposition of the bag layer on the pallet, the layer is squared by three pattern squaring bars or fences (FIGS. 1, 13, 14, 15) 214, 216, 218 in addition to the sweep bar. The pattern squaring bars 214, 216 are movable inwardly toward the bag layer under the influence of power cylinders 217, to square the bag pattern to uniform dimensions and press the bags tightly together. The rail 218 can be stationary. The sweep bar 160 forms the fourth member for confining and squaring the pattern and pushes against the fixed rail 218. Although both rails 216, 218 are described as being movable, rail 216 can be fixed. All fixed rails are adjustable to accommodate different bag patterns. The rails can be provided with plastic covered cleats to provide a straight bag stack outline on the pallet and thus eliminate gaps between bags inside the stack. After the pattern is squared the plates 206, 208 are retracted into the broken line position in FIG. 13 by a mechanism not shown, to deposit the layer on a pallet 210. The bag drop height is kept at a minimum to prevent disorientation of the bags in the layer. Normally, the bag drop distance is slightly greater than the bag thickness. The packer plates 206, 208 are then closed and the pallet elevator is raised against the under surface of the packer plates 206, 208 to press and flatten the bags. The cycle is repeated with successive layers of bags until the pallet is filled. The filled pallet is moved from the pallet elevator by a discharge conveyor portion of lift 202.

PALLET DISPENSER 250

Pallets 210 are supplied to the pallet elevator by the pallet dispenser 250 (FIGS. 1, 15, 16, 17) which includes an upstanding frame 252. The frame 252 also includes horizontal spaced rails 254 (FIG. 16) which support the load of pallets in the down position. The pallets are supported in the up position by a fork 260 with two spaced tines. In accordance with the invention means are provided for raising and lowering the fork 260 and reciprocating the fork 260 in two vertically spaced horizontal paths for separating the lowest pallet in the pallet stack from the upper pallets. As disclosed, the means includes a rack and pinion drive for the fork 260 with rack teeth 262 on the lower surface of the fork, and pinion gears 264 on shaft 265 driven by a motor 266. The fork 260, motor 266 and shaft 265 are carried by a subframe 270 which is provided with axles 273 and trolley wheels 274 which ride in tracks 276 in the upstanding frame. Vertical movement of the subframe 270 is provided by a power cylinder 280 which is connected to a frame cross member 282 (FIG. 17).

The dispenser 250 also includes a pallet pusher 286 (FIG. 15, 16, 18) supported on wheels 288 which travel on tracks 290. The pusher 286 is connected to an endless chain 292 which shuttles the pusher 286 back and forth to move pallets onto the conveyor 300 which carries the pallets to the pallet elevator.

In operation of the pallet dispenser 250, a full stack of pallets 294 carried by the fork 260 is lowered until the stack of pallets is supported on the track 254 with the fork 260 extending into the lowermost pallet in the stack when in position A (FIG. 16). The fork 260 is then retracted horizontally to the B position free of the pallets by energizing motor 266 and the fork and subframe 270 is raised to the C position by energizing power cyclinder 280. The fork 260 is then moved horizontally to the D position beneath the platform of the second lowest pallet in the stack. The subframe 270 and fork 260 are then raised to lift and separate the pallet stack 294 from the lower pallet which is then pushed onto the conveyor 300 by the pallet pusher 286.

OPERATION

In operation of the palletizing apparatus and referring to FIG. 1, photocell PC1 controls bag flow on conveyor 8 to the vibrating and flattening station 10. The photocell PC1 operates controls not shown for starting and stopping the conveyor 8 or other supply or accumulator means to regulate bag flow. The photocell PC2 counts or senses bags entering the diverter station 30 and provides a signal which controls the position of the diverter guide assembly 29. The photocell PC3 provides a signal in response to interruption by a bag to control the position of the turnpost deflector 56. The photocell PC4 senses movement of bags into the row forming station 100 and controls operation of the row shifting fork 104.

Figure 25:
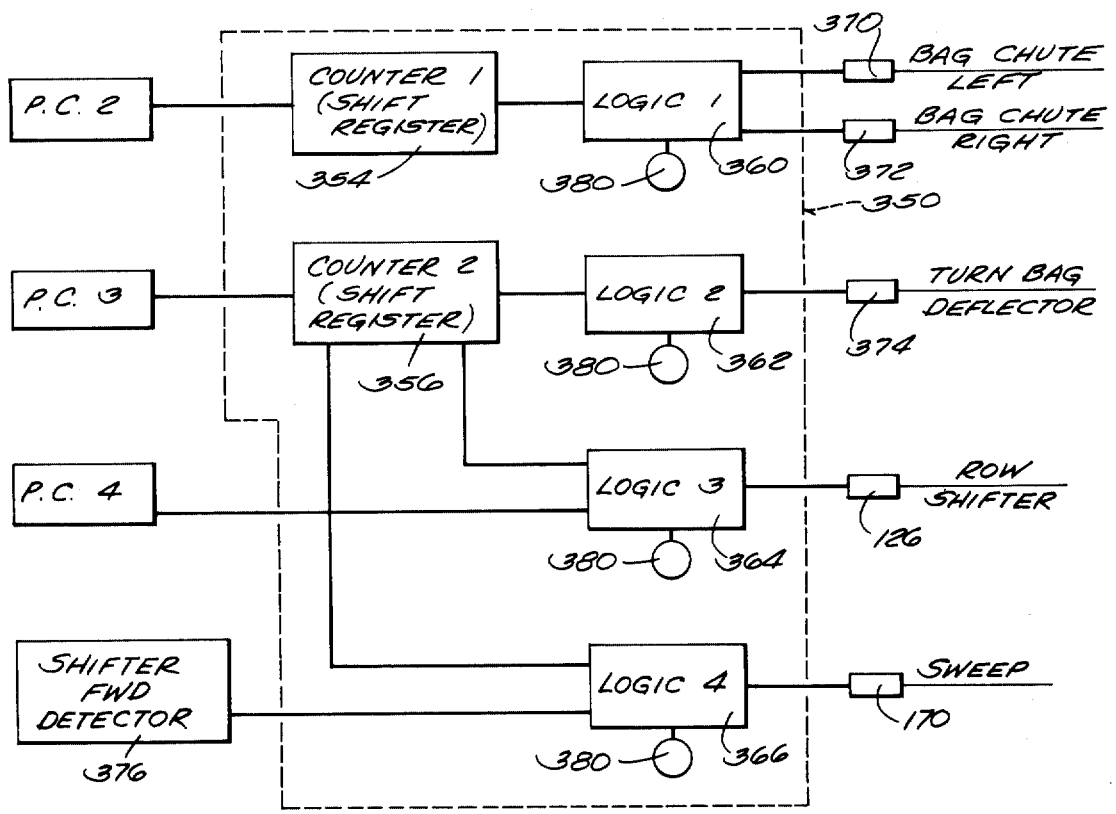
FIG. 25 is a diagrammatic view showing the program controller for pattern formation.

As shown in FIG. 25 the means provided for programmably controlling formation of a selected pattern and alternating the orientation of a pattern between layers comprises a programmable controller 350 located within the broken line outline. A programmable controller such as the model S-D 77 of Struthers-Dunn Systems Division, or an equivalent has the control features required to operate the palletizing apparatus of the invention. The programmable controller 350 is provided with a counter shift register 354, and a counter shift register 356. For purposes of illustration the logic circuits are broken down to logic stages 360, 362, 364, and 366.

The output of logic stage 360 operates solenoid valves 370 and 372 to operate the pneumatic cylinder 44 for the bag diverter or guide assembly 29.

The logic stage 362 has an output connected to a solenoid valve 374 to operate the pneumatic cylinder 58 for the turnpost deflector 56.

The logic stage 364 provides the output to control the row shifter fork motor 126 for the fork 104.

The logic stage 366 provides an output to control the motor 170 which operates the sweep bar 160 to sweep a full layer into the pallet elevator. A micro-switch 376 (FIG. 1) is actuated by the row shifter mechanism to cause energization of the full layer sweep motor 170 in proper sequence.

The programmable controller 350 has selector switch controls 380 to preset the controller 350 to form various selected bag patterns. The selection of a bag pattern depends on bag size, and customer requirements for further handling. The pattern is selected which gives the desired stability to the bag stack with maximum utilization of the pallet area.

Figure 24:
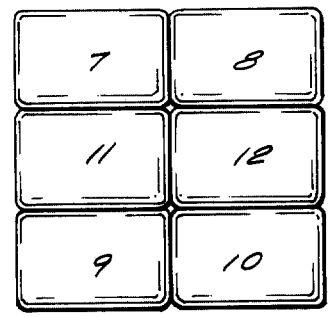
FIG. 24 is a diagrammatic view of layer two of the pattern in FIG. 23.

FIG. 23 shows a patterned layer 1 in which bags 1 through 6 all have the same orientation. FIG. 24 shows layer 2 for the same pallet in which the bags are all in the same orientation but at 90° with respect to the pattern of layer 1. Rotation of successive layers on a pallet which may hold 8 to 10 layers or more is essential for stability of the stack.

Figure 26:
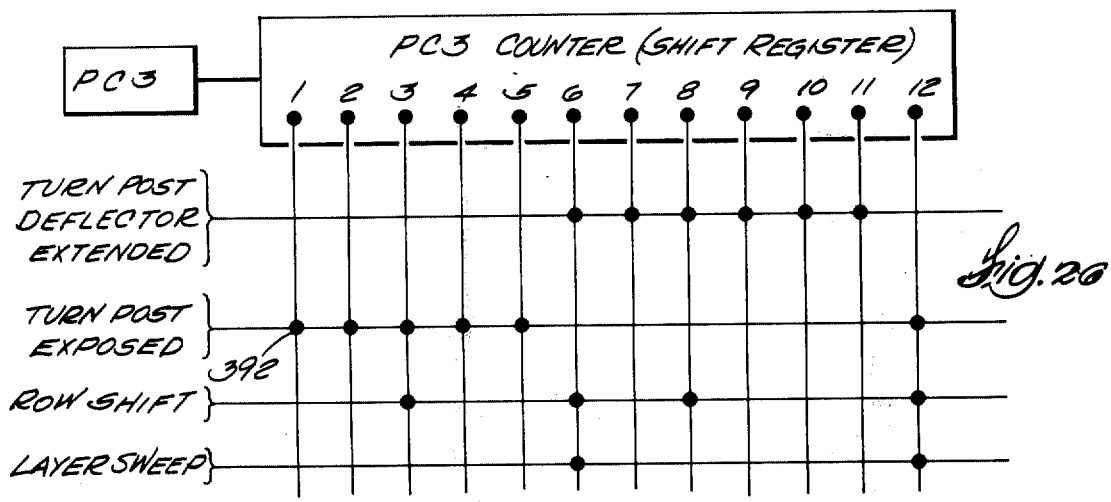
FIG. 26 is a diagram of the logic program for forming the pattern layers 1 and 2 shown in FIGS. 23 and 24 as controlled by photocell PC3.
Figure 27:
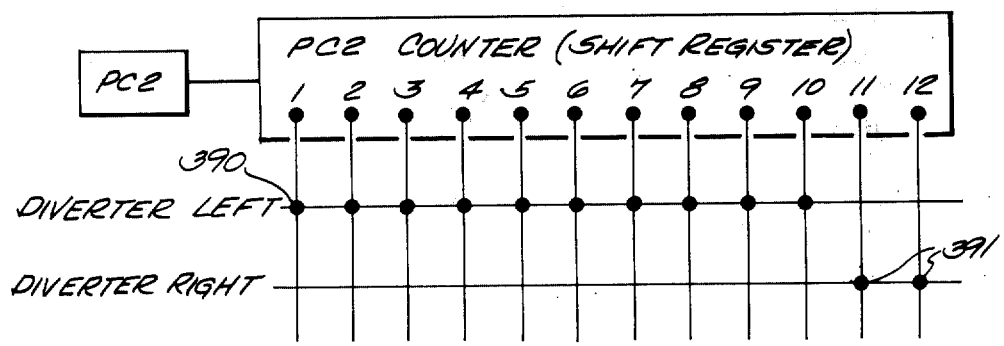
FIG. 27 is a diagrammatic view showing the logic program controlled by photocell 2 for forming the patterns shown in the FIGS. 23 and 24.

FIGS. 20 and 21 show the operation sequence performed for successive layers of patterns 1 and 2. FIG. 26 is a graphic illustration of the computer program and control thereof by PC3. FIG. 27 is an illustration of the program and control thereof by PC2.

Referring to FIGS. 20 and 26, the counter or shift register shown in 32 can count 12 bags. When commencing the formation of pattern 1 initially, PC2 will sense bag 1 and the solenoid valve will be energized to position the diverter 29 to the left position for the left lane as shown in FIG. 20. In the FIG. 27, the dots 390 indicate the relation between the counted bag and the diverter position left, thus for bags 1 through 10 the diverter will be in the FIG. 20 position and for bags 11 and 12 the diverter will be in the right position shown in FIG. 21, as shown by dots 391 (FIG. 27). In FIG. 26 the dots 392 indicate the sequential functions and position of various components.

Referring to FIG. 20 the deflector 56 is shown in the retracted position and after the photocell PC3 counts six bags, the turnpost deflector 56 is extended to the position shown in FIG. 21 to prevent turning of bags during formation of the second layer with bags 7 through 12. In forming the first layer after PC3 senses three bags which would be bag Nos. 1, 2 and 3, the row shifter fork 104 will move bags 1, 2 and 3 into the dotted line position shown in FIG. 20. The row shifter will again be energized after bag 6 is counted by PC3 and PC4 which provide a pulse to logic stage 364 (FIG. 24) to cause energization of the row shifter motor 126. When bags 1, 2, 3 and 4, 5 and 6 have been moved to the complete layer station 150, the full layer sweep mechanism is actuated by the mechanical movement of the parts of the fork 104 engaging the micro-switch 376. As shown in FIG. 26, a positive connection is shown for the layer sweep to move the layer containing bags 1–6 onto the pallet elevator 200 (FIG. 20).

Referring to FIG. 21, in formation of the second layer containing bags 7–12, after bags 7 and 8 are shifted to the layer station 150 and bags 9 and 10 are at the station 100, bags 11 and 12 are sent down the right lane forwardly of bags 9 and 10. After bag 12 is counted, bags 11, 12, 9 and 10 are shifted in concert to the full layer station to complete the layer. FIGS. 26 and 27 show the programmed positions for the diverter 29 and turnpost deflector for the formation of the second layer. As bag 1 is sensed by PC2 for the third layer, FIG. 27 shows that diverter 29 will be shifted to the left lane for forming a layer containing bags 1–6.

Figure 29:
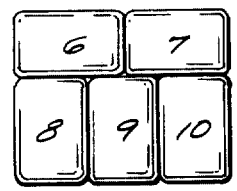
FIG. 29 is a view similar to FIG. 28 of the second layer of the pattern shown in FIG. 28.
Figure 30:
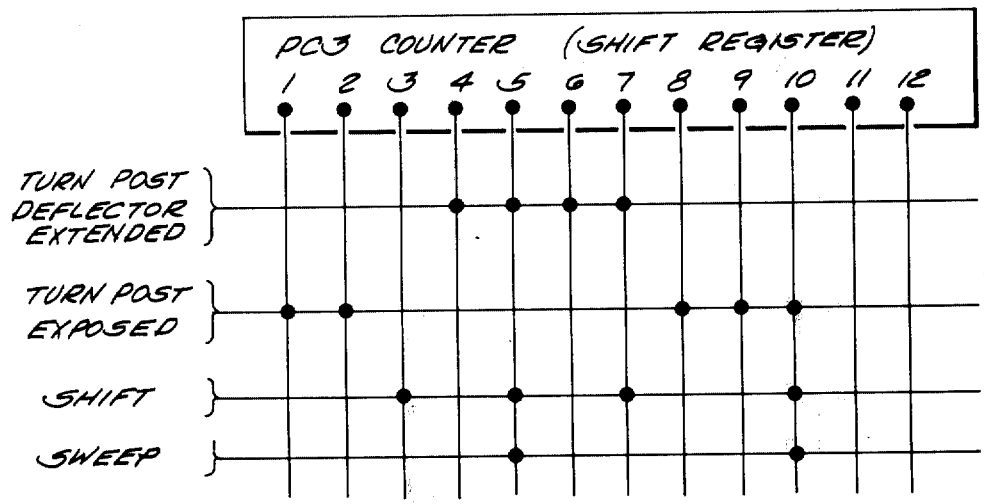
FIG. 30 is a diagram of the logic program controlled by photocell PC3 for formation of the patterned layers shown in FIGS. 28 and 29.
Figure 31:
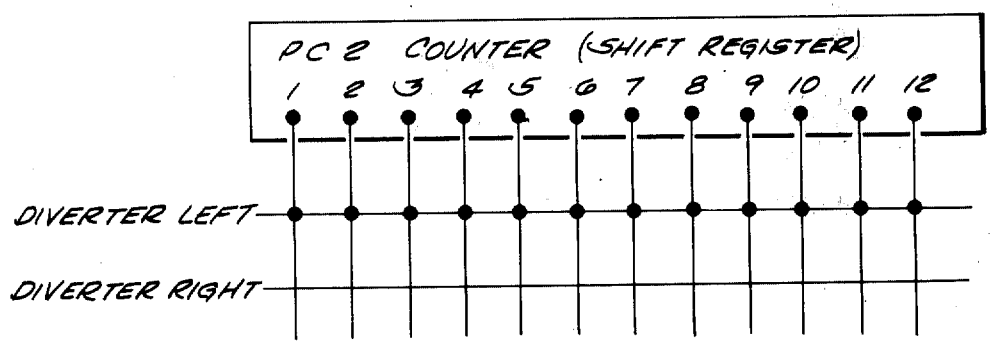
FIG. 31 is the logic diagram controlled by photocell PC2 for the pattern formation of the layers shown in FIGS. 28 ad 29.

FIG. 28 shows layer 1 in a five bag pattern. FIG. 29 shows layer 2 for the same pattern. FIGS. 30 and 31 show the program for which the controller is set for this pattern. As shown in FIG. 31, all the bags are diverted by the diverter 29 to the left lane, thus, there is no change in the position of the diverter during formation of the rows ad layers 1, 2. The turnpost deflector 56, however, is alternated. For the bags 1, 2 and 3 the turnpost deflector exposes the turnpost 52 as shown in FIG. 20. The row shifter fork 104 is actuated after bags 1, 2, 3 have been sensed by PC4 to move the bags 1, 2 and 3 into the full layer station 150. For bags 4 and 5 the turnpost is screened by the deflector 56. After PC4 senses the bag 5 the row shifter is again actuated to move bags 4 and 5 into the full layer station. When the sweep is actuated by micro-switch 376 the five bag layer is moved into the pallet elevator. After bags 6 and 7 move into the row forming station PC3 causes movement of the deflector 56 to expose the turnpost to turn bags 8, 9 and 10 90° from bags 6 and 7, to complete the bag orientation for layer 2.

In addition to the foregoing controls, various limit switches and other photocells are employed in the automatic sequencing of the machine. In FIG. 1 some additional limit switches and photocells are shown in their approximate locations. The limit switches 400 and 402 control the full bag layer sweep or pusher 160. The limit switch 404 controls the upper limit of the pallet lift. The switch 406 senses packer plates open. The switch 408 senses packer plates closed. The switch 410 and 412 control movement of the rails 214, 216. The limit switch 414 determines the lower limit of the elevator. Additional limit switches (not shown) are associated with the pallet dispenser 250 to control the dispensing sequence. A timer switch is desirably employed in the pallet elevator circuit to control movement of the pallet lift for the packing operation. For instance, after a layer has been deposited on the pallet the lift lowers as previously described until the timer times out. When the packer plates are closed the lift raises until limit switch is actuated after the bags are suitably compressed.

Although the disclosure herein deals principally with the use of a single turnpost in the left lane, turnposts can be employed in both lanes and two turnposts can be used in a single lane for certain bag patterns.

It is claimed:

1. Apparatus for palletizing bags including means for supplying bags, a row forming station, bag diverter means located intermediate said row forming station and said means for supplying bags, said bag diverter means including a bag diverter assembly and a diverter conveyor, means for selectively moving said diverter assembly between first and second positions to change the path of movement of bags into first and second lanes on said diverter conveyor, and turning means associated with one of said lanes and selectively engageable with bags traveling in said lane to rotate selected bags 90° from the bag orientation of bags traveling in the other of said lanes to form a pre-selected row pattern of bags at said row forming station and wherein said turning means includes a turning post located in the path of travel of bags in one of said lanes, and a turnpost deflector movable from a retracted position exposing said post for engagement with the bags in said one lane to an advanced position to direct bags into a clearance position with respect to said turning post to prevent engagement of said bags with said turning post and thus prevent a change of orientation of said bag in said lane.

2. Apparatus for palletizing bags including supply means for supplying bags along a first axis, a row forming station having a platform and row transfer means for shifting bags along a second axis transverse to said first axis, bag diverter means located intermediate said row forming station and said supply means, said bag diverter means including a bag diverter assembly and a diverter conveyor, means for selectively moving said diverter assembly between first and second positions to change the path of movement of bags into first and second lanes on said diverter conveyor, turning means associated with one of said lanes and selectively engageable with bags traveling in said lane to rotate selected bags 90° from the bag orientation of bags traveling in the other of said lanes to form a pre-selected row pattern of bags at said row forming station, said turning means including a turning post located in the path of travel of bags in one of said lanes, and a turnpost deflector movable from a retracted position exposing said post for engagement with the bags in said one lane to an advanced position to direct bags into a clearance position with respect to said turning post to prevent engagement of said bags with said turning post and thus prevent a change of orientation of said bag in said lane, a full layer platform located adjacent said row forming station for receiving rows of bags from said row forming platform, a final pattern forming station including a pallet elevator having a bag supporting apron, full layer sweep means for moving complete bag layers from said full layer platform onto said apron, sensors for detecting bag movement upstream and downstream of said bag diverter means, and programmable means operated by said sensors to actuate said means for moving said diverter means to cause bag movement in the appropriate lane for the selected and cause contact of appropriate bags wth said turning means and energize the row transfer means to transfer a bag row to said full bag layer platform when said sensors count the appropriate number of bags and energize said full layer sweep means to sweep a full layer of bags unto said apron.

3. Palletizing apparatus including a row forming station having a platform formed by spaced driven rollers, a conveyor for bringing palletizable articles to said row forming station, a full layer forming platform, a row transfer fork, means for moving said fork between first and second positions to shift a row of articles from said row forming station to said full layer forming platform, said means including means for raising said fork between said rollers and above said rollers into an above roller position and for advancing said fork in its above roller position to the second horizontally displaced position to deposit said rows on said full layer forming platform and to lower said fork beneath articles on said rollers for return movement to said first horizontal position, said means including a first guide track, rollers connected to said fork and movable on the upper surface of said first guide track during advance of said fork to said first position with said rollers located below said first track during retraction of said fork, a second guide track below said first guide track, a reciprocating trolley movable on said second track, linking means connecting said trolley to said fork, and a motor having means connected to said trolley to reciprocate said trolley and move said fork between said first and second horizontal positions.

* * * * *